US008195618B2

(12) United States Patent
Kreiner et al.

(10) Patent No.: US 8,195,618 B2
(45) Date of Patent: Jun. 5, 2012

(54) DISCLOSURE BOOTH

(75) Inventors: Barrett Kreiner, Woodstock, GA (US);
Jonathan Reeves, Roswell, GA (US);
Samuel Zellner, Dunwoody, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 767 days.

(21) Appl. No.: 12/177,939

(22) Filed: Jul. 23, 2008

(65) Prior Publication Data

US 2010/0023538 A1    Jan. 28, 2010

(51) Int. Cl.
*G06F 17/00* (2006.01)
(52) U.S. Cl. .......................... 707/672; 707/803
(58) Field of Classification Search .............. 707/672, 707/802, 803; 386/291, 295, 299
See application file for complete search history.

(56) References Cited

U.S. PATENT DOCUMENTS

| | | | |
|---|---|---|---|
| 6,086,380 A | 7/2000 | Chu et al. | |
| 6,369,908 B1 | 4/2002 | Frey | |
| 6,643,652 B2 * | 11/2003 | Helgeson et al. | 707/770 |
| 7,193,916 B2 * | 3/2007 | Yokota et al. | 365/218 |
| 7,272,646 B2 * | 9/2007 | Cooper et al. | 709/223 |
| 7,321,387 B2 | 1/2008 | Novais | |
| 7,356,569 B1 * | 4/2008 | Kembel et al. | 709/217 |
| 7,756,967 B1 * | 7/2010 | Kembel et al. | 709/224 |
| 7,761,444 B2 * | 7/2010 | Zhang et al. | 707/713 |
| 7,958,159 B1 * | 6/2011 | Tran et al. | 707/802 |
| 2007/0201103 A1 | 8/2007 | Morgan | |

FOREIGN PATENT DOCUMENTS

WO    2007056632    5/2007

OTHER PUBLICATIONS

U.S. Appl. No. 11/419,786, filed May 23, 2006.
U.S. Appl. No. 60/732,157, filed Nov. 2, 2005.
Legalzoom Provisional Patents Questionnaire found at www.legalzoom.com/questionnaire/QPage_21_1-6; Jul. 22, 2008.

* cited by examiner

*Primary Examiner* — Shahid Alam
(74) *Attorney, Agent, or Firm* — Parks IP Law LLC; Jennifer P. Medlin, Esq.

(57) ABSTRACT

Methods, systems, and devices are disclosed for facilitating the disclosure of information from a disclosing party. Such a system may comprise a computing device including an operating system executing within the computing device; a software application operating in conjunction with the operating system, the software application prompting the disclosing party for at least two of audio/visual data, graphic data and textual data in response to the prompt; means for contemporaneously collecting the at least two of audio/visual data, graphic data and textual data from the disclosing party; and means for irrecoverably erasing the least two of the audio/visual data, graphic data and textual data from both the computing device and the means for contemporaneously collecting the at least two of audio/visual data, graphic data and textual data.

12 Claims, 6 Drawing Sheets

DISCLOSURE BOOTH

BACKGROUND

Communications from corporate management downward is usually fast and hopefully efficient. Corporations have been refining such techniques for decades. However, communications upward from individuals to the appropriate people in large corporations has typically been difficult due to the lack of appropriate systems, lack of priority or lack of knowledge of how to do so. The most infamous employee communication method is the "suggestion box", which is quite inefficient even if it is used by management. Because of the actual or perceived difficulties involved with confidential "up the ladder" communications, many good ideas and information from employees never reach the proper individuals in a corporation. Such information may include Sarbanes-Oxley whistle blowing information, patentable subject matter, and efficiency ideas, to name a few. Such, communications may further be impeded by the concentration and segregation of expertise in distant or otherwise inaccessible corporate locations such as corporate attorneys, engineers, and scientists.

Obtaining information from a disclosing party historically has been a manual process requiring a personal face-to-face meeting between the disclosing party and an audience. Such meetings necessarily require scheduling of attorneys and other professionals during busy business hours, all of which entails a cost. Further, such meetings usually result in a collection of notes and maybe an audio recording.

Communications may be facilitated by providing convenient, secure locations and user friendly technology to a corporation's general employee population. Such locations may be fixed or portable. The locations may be specialized structures or specialized equipment deployed in a secure space such as an office. Although the type of information being communicated by a disclosing party may be quite varied, the subject matter disclosed herein will be discussed in terms of a provisional or a non-provisional patent application disclosure. Any specialized terms or acts unique to the patent disclosure process are merely exemplary and are not meant to limit this disclosure to the patent disclosure process.

SUMMARY

Exemplary embodiments provide apparatuses for obtaining the secure disclosure of information from a disclosing party. The apparatus may include a computing device that further includes an operating system executing within the computing device, a software application operating in conjunction with the operating system, the software application prompting the disclosing party for at least two of audio/visual data, graphic data and textual data in response to the prompt, means for contemporaneously collecting the at least two of audio/visual data, graphic data and textual data from the disclosing party; and means for irrecoverably erasing the at least two of the audio/visual data, graphic data and textual data from both the computing device and the means for contemporaneously collecting the at least two of audio/visual data, graphic data and textual data.

Exemplary embodiments include methods for obtaining the secure disclosure of information from a disclosing party by a computing device. Methods may include receiving a log-in establishing an identity of the disclosing party and receiving a transducer output initiated by the disclosing party. The transducer output instantiatiates a disclosure software application resident within the computing device. The method provide a prompt to the disclosing party to provide audio/visual data, graphic data and textual data. In response at least two of audio/visual data, graphic data and textual data from means for contemporaneously collecting the at least two of audio/visual data, graphic data and textual data are received in response to the prompt. The method then uploads the at least two of audio/visual data, graphic data and textual data after the disclosure software application has terminated and irrecoverably erases the at least two of the audio/visual data, graphic data and textual data from both the computing device and from the means for contemporaneously collecting the at least two of audio/visual data, graphic data and textual data.

Exemplary embodiments may include a tangible computer readable medium containing instructions thereon for accomplishing certain acts. Those acts may include receive a log-in establishing an identity of the disclosing party and then receiving a transducer output initiated by the disclosing party. The transducer output instantiates a disclosure software application resident within the computing device that provides a prompt to the disclosing party to provide audio/visual data, graphic data and textual data. The acts may also receive at least two of audio/visual data, graphic data and textual data from means for contemporaneously collecting the at least two of audio/visual data, graphic data and textual data in response to the prompt and then upload to a network the at least two of audio/visual data, graphic data and textual data after the disclosure software application has terminated. After uploading, the acts may include irrecoverably erasing the at least two of the audio/visual data, graphic data and textual data from both the computing device and from the means for contemporaneously collecting the at least two of audio/visual data, graphic data and textual data.

DETAILED DESCRIPTION

Figure 1:
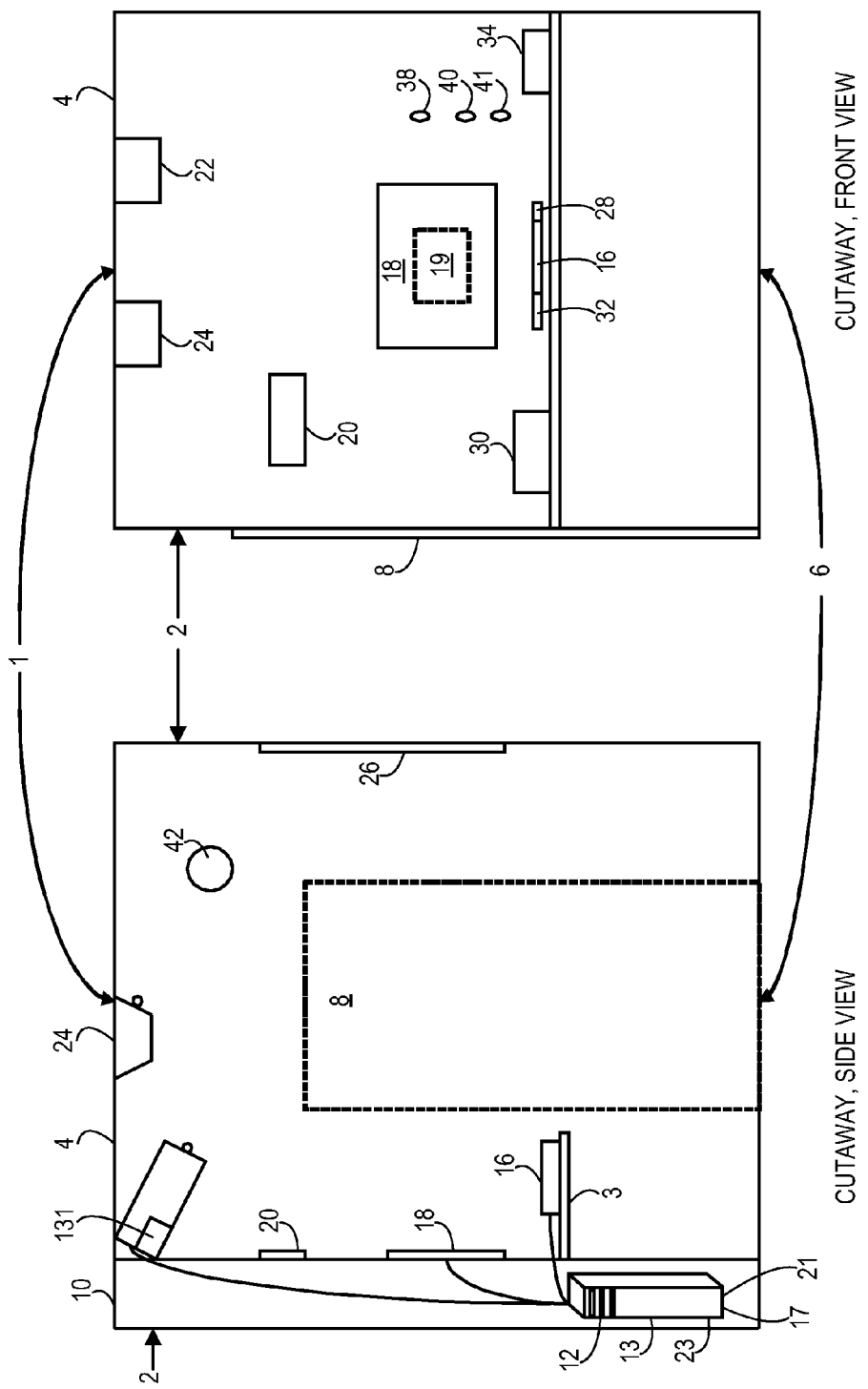
FIG. 1 is a conceptual drawing of an exemplary embodiment of an invention booth.

Exemplary embodiments will now be described more fully hereinafter with reference to the accompanying drawings where like reference numbers refer to like components. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limiting.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Embodiments within the scope of this disclosure include computer readable media having instructions or data fields stored thereon. The computer executable instructions may include program code means for executing selected processes of methods disclosed herein. The computer readable media may be any available media which can be accessed by a general purpose or a special purpose computer. Non-limiting, exemplary computer readable media may include magnetic disks, optical disks, flash memory, memory sticks and RAM. The computer readable media may be volatile or non-volatile or a combination thereof. RAM may be any type of RAM currently existing or developed in the future. Non-limiting examples of RAM may include Ferroelectric RAM, Magnetoresistive RAM, Phase-change RAM, Semiconductor-Oxide-Nitride-Oxide-semiconductor memory, Resistance RAM, Nano-RAM, Dynamic RAM ("DRAM"), embedded DRAM, Static RAM ("SRAM"), 1T-SRAM from Monolithic System Technology, Inc., Zero capacitor RAM and Twin Transistor RAM. A ROM may be any type of ROM currently existing or developed in the future. Non-limiting examples of ROM may include Programmable ROM ("PROM"), Erasable PROM ("EPROM"), and Electronically EPROM ("EEPROM").

FIG. 1 depicts front and side cut away views of an exemplary embodiment of a disclosure booth 1. Although depicted as a cuboid comprising four walls 2, a ceiling 4 and a floor 6 for purposes of simplicity, the actual dimensions and shape may vary from one embodiment to the next and are not limiting on the present disclosure. The disclosure booth physical shape and/or dimensions may vary as to satisfy a particular physical or aesthetic requirement. As non-limiting examples the structure may be spherical, cylindrical, pyramidal, a geodesic dome or a parallelepiped (i.e. a cuboid). The structure may combine structural elements of any of the foregoing or other shapes as may be desired. The disclosure booth 1 also has an access 8, such as a door or other aperture, whereby a disclosing party may enter and exit the disclosure booth. The access 8 may be securable with a door or other closure device in order to provide a level of desired security and confidentiality. The access 8 may be of any desired dimensions.

Given that any disclosure being provided within the disclosure booth 1 may be confidential, it may be preferable that the disclosure booth is sound proof, or at least sound resistant. The disclosure booth 1 may be made sound proof by selecting the proper composition and/or the construction of the walls 2, ceiling 4 and floor 6, which would be well known in the art. Alternatively or in addition to physical measures, sound proofing may also be effected by electronic means such as the use of a white noise generator (not shown) or the use of a destructive interference system (non shown) as may be known in the art. Each of the white noise or destructive interference techniques may utilize microphones and/or speakers 42 in or around the outside of the disclosure booth as may be known in the art to mask or cancel out any sound from within the disclosure booth 1.

Although not of importance concerning the subject matter of this disclosure, but as a matter of practicality and comfort, the disclosure booth 1 may include various utility apertures for the inclusion of ventilation systems, electrical systems, communications cables and the like. Such utility apertures are not shown in the drawings for the sake of clarity and will not be discussed further.

The disclosure booth 1 may also have a utility space 10 for the enclosure and segregation of electronics 12 and any utility equipment (not shown) from the remainder of the disclosure booth. The utility space 10 may be securably accessible from either inside or outside the disclosure booth 1. The location of the utility space 10, the access thereto (not shown) and the security devices thereof may be designed to be located anywhere on or within the disclosure booth 1 as may satisfy the specific needs of the disclosure booth designer.

The electronics 12 may be a single system, multiple independent systems or multiple integrated systems. As non-limiting examples, the electronics 12 may comprise a computing device such as a server, one or more modems, a network switch, router, video equipment, wireless transceiver and/or audio/visual projection equipment. The electronics 12 may support other peripheral equipment installed within the disclosure booth 1. The specific nature and type of the electronics 12 may vary from one embodiment to the next as advances in technology over time will induce one of ordinary skill in the art to use electronics commensurate with the advances in technology. For the sake of simplicity, the electronics 12 are interchangeably referred to herein as a computer, a server or a computing device. The computer 12 may include an operating system 13, a memory 23, a voice recognition/response application or module 17 and a disclosure application 21 which operates the disclosure booth 1 and allows interaction with the disclosing party.

Inside, the disclosure booth 1 may include a number of peripherals. The peripherals may include a keyboard/mouse 16, a display screen 18, an elapsed time indicator 20, a digital video camera 22 (with sound capability), an overhead projector 24, an electronic whiteboard w/print capability 26, a USB access device 28, a document capture device 30 such as a scanner or a still camera, an optical disk reader 32, a personnel identification device 34 and a speaker, such as the speaker 42, for providing audio communications to the disclosing party. Each of these devices is functionally integrated and/or controlled by (or through) the computing device 12 on a direct or a distributed basis. The disclosure booth 1 may also include a table 3, the type of which is up to the discretion of the designer of the disclosure booth.

The video camera 22 maybe any type of video camera or camcorder. The video camera 22 may have sound capability and sufficient resolution so as to be able to record what is said in the disclosure booth 1 or what is drawn on the whiteboard 26 as the disclosing party explains his invention. In addition to merely recording the disclosure of the disclosing party, the video camera 22 may be used to supervise the disclosure session remotely either in real time or on a delayed basis. Such a supervisor may be a person such as a patent agent or attorney. Through the speaker 42, the monitoring person may be able converse and interact with the disclosing party while the disclosing party is narrating his invention. The monitoring party may also be able to directly control any and all peripherals within the disclosure booth 1 and may override or augment the disclosure booth's disclosure application 21. As a non-limiting example, the cameras 22/22' may be controlled via a firewire camera system such as those obtainable from Cohu, Inc. of San Diego, Calif. Another non-limiting example for a means of control of any of the peripherals may include the use of NetMeeting software from Microsoft Corporation.

Such monitoring or override capabilities are known in the art. Some commercial, non-limiting examples utilizing such technology may include GoToMeeting.com, PCAnywhere from Symantec Inc., Sun Ray from Sun MicroSystems, Virtual Network Computer (VNC) by AT&T Labs, and the Remote Assistance feature found on Microsoft Windows XP®. See also U.S. patent application Ser. No. 10/607,895 to Barrett Kreiner (now U.S. Patent published application 2004/0268321).

As a non-limiting example, the monitoring party may be able to control a graphical user interface ("GUI") 19 displayed on the display screen 18. As non-limiting examples, the monitoring party may cause a question or a directive to appear in the GUI 19 or cause a button selection to appear. In an alternative embodiment, the monitoring party may merely type or otherwise insert a question that is displayed on the computer screen 18 via a graphical user interface ("GUI"), such as the GUI 19. Further embodiments may cause graphic icons to appear either on the computer screen 18 or within the projected field of the interactive projector 24. Further still, light emitting diodes integrated within any of the peripherals may also be utilized as a means of communication with the disclosing party. Non-limiting examples of inserted questions may include "Do you have a document to scan?, "Save and Upload the Current Drawing", "Enable the Whiteboard" or "Scan Document to File". Inserted questions may be implemented using any available means such as a simple script. As non-limiting examples, such scripts may be created by any available software languages such as Perl, Hypertext Preprocessor and javascript.

The display screen 18 may be any type of display screen. However, the display screen 18 is may be a flat screen display with touch screen capability in order to facilitate communication with the computing device 12 and any monitoring parties.

The elapsed timer 20 may be any type of analog or digital timer in communication with the computer 12. The elapsed timer 20 may be a digital count down timer which is initiated at the beginning of the disclosure process and terminates the disclosure process when the time has elapsed. A timer may be used to ensure prompt disclosure and to minimize the wait time for other employees. The amount of time allotted by the elapsed timer 20 may be controlled by the nature of the subject matter to be disclosed as indicated by the disclosing party while communicating with the computing device 12 via the display screen 18. For example, the disclosure of a cellular communication subsystem may be allotted more disclosure time than for a business method. The type of subject mater may be indicated by inputting a subject code or may be determined by parsing the disclosing party's written or oral words to reference an interactive database 120.

The allotted time may also be controlled by the identity of the disclosing party(s). The identity of the disclosing Party(s) may be indicated by the personnel identification device 34. In order to begin operation of the disclosure booth 1, the disclosing party(s) may have to present an employee ID card, a finger print, voice recognition, a retinal scan or some other positive means of personal identification to the personal identification device 34. The personal security device 34 may be any electronic device or system that may positively identify a disclosing party based on an input known to be unique to the disclosing party. Based on the disclosing party's identification and possibly the nature of the subject matter to be disclosed, a time period may then be set. Of course, in an alternative embodiment, provisions may be made to override or extend the initially set time period.

The personnel identification device 34 also may have other functions. Non-limiting examples may include such acts as enabling the computer 12, enabling any or all of the peripherals, indicating or verifying a signature, and accessing personal information from sources outside of the disclosure booth 1. The disclosing party's identity may also be established by typing in a login and password ID into the computer 12 via the keyboard 16 or may be established visually by monitoring personnel via the video camera 22.

The invention booth 1 may also have a number of mechanical or audio transducers. As a non-limiting example, the number of transducers may include a mechanical or audio start transducer 38, a mechanical or audio submit transducer 40 and/or a mechanical or audio re-record transducer 41. The mechanical or voice manipulation of the start transducer 38 may initiate the disclosure booth procedure (See FIG. 5) and enable control of the computer 12 by the disclosing Party(s). The mechanical or voice manipulation of the re-record transducer 41 may cause the disclosed information captured by the computer 12 to be re-recorded by the computer 12. The mechanical or voice manipulation of the send transducer 40 may cause the disclosed information captured by the computer 12 to be compiled by the computer 12 and then transmitted from the computer 12 to a destination outside of the disclosure booth 1.

After the transmission of the disclosure information from the disclosure booth 1 is completed and receipt confirmed, then the equipment inside the disclosure booth 1 may be locked out or shut down. Manipulation of the submit transducer 40 may also initiate an erasure process which erases all of computer readable media within the disclosure booth 1 including any or all hard drives, RAM, and flash memory within any piece of equipment inside the disclosure booth such that after the disclosure package is transmitted, no vestige of the disclosure remains within the disclosure booth that may be recovered and/or compromised.

The digital audio/video camera 22 is one means within the disclosure booth 1 to capture the disclosure. The digital video camera 22 may be a webcam. The digital video camera 22 may be situated such as to capture both the disclosing party(s) and the whiteboard 26 which may be located on the opposite side of the disclosure booth 1 from the digital audio/video camera.

Further, the digital camera 22 also may function as a second means by which to identify the disclosing party(s) by utilizing a computerized feature recognition system as may be known by one of ordinary skill in the art. The video camera 22 may be monitored by persons outside of the disclosure booth 1 on a real time basis. Such an arrangement would allow positive ID via personal recognition and further allow two way communication between the disclosing party(s) and an observer elsewhere.

The projector 24 may be any type of projector that may project an image. The projector 24 may be a digital overhead projector such that when the disclosing party(s) present graphical material (i.e. slides) such material may be captured by the digital audio/video camera 22 along with the disclosing party(s)'s vocal narrative. The disclosing party(s) may use the USB access port 28 or the optical disk drive 32 to input his graphical presentation into the computer 12 for display by the projector 24 on the whiteboard 26 and or upon the opposing wall 2 of the disclosure booth 1. One of ordinary skill in the art would recognize that the keyboard 16 or the touch screen 18 may be used to control the projector 24 and the whiteboard 26.

The disclosure booth 1 may also be outfitted with a document scanner, such as the document capture device 30, which may be used to capture any documentary materials being presented by the disclosing party(s). The scanner 30 may be any type of scanner as is deemed desirable by a designer of the disclosure booth 1. The scanner 30 may be controlled locally or may be controlled by the computer 12 via its keyboard 16 or touch screen 18.

The whiteboard 26 may be any type of conventional whiteboard whereby the disclosing party(s) may diagram his subject matter. As non-limiting examples, the whiteboard 26 may be completely manual. The whiteboard 26 may be an electronic whiteboard where a digital copy of the sketched disclosure may be saved to the computer 12. Alternatively, the whiteboard may be replaced with a touch screen or an electronic tablet allowing the disclosing party(s) to sketch or otherwise present their information.

Figure 2:
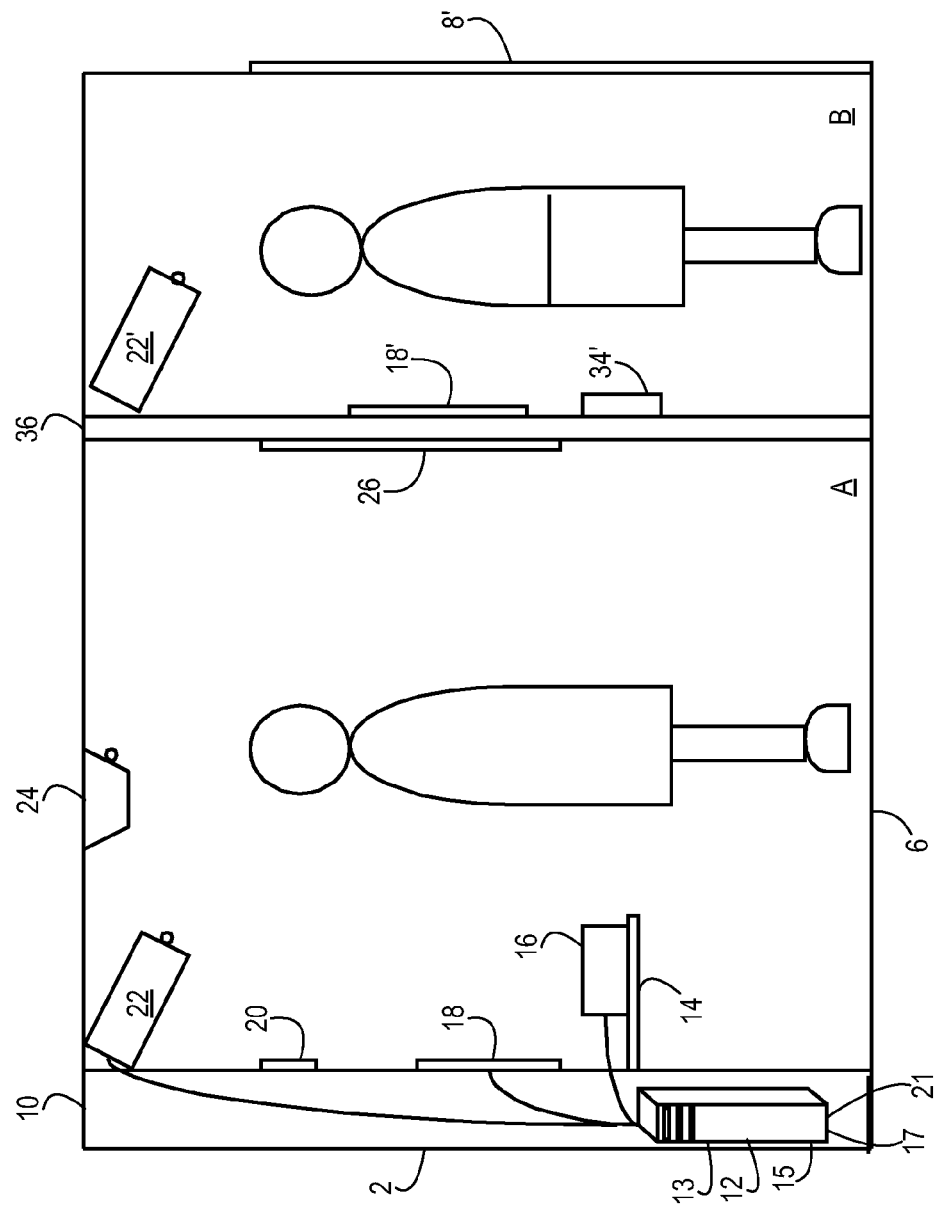
FIG. 2 is a conceptual drawing of an exemplary embodiment of an invention booth that may process multiple disclosures simultaneously.

FIG. 2, is a depiction of another exemplary embodiment of the disclosure booth 1. In FIG. 2, a bulkhead 36 separates a cuboid into two compartments. The first compartment (A) may comprise essentially the disclosure booth 1 of FIG. 1 and its accoutrements. The second compartment (B) may include (among other accoutrements) a second screen 18', a second identification device 34' and a second video camera 22'. The purpose of compartment B may be to identify the disclosing party(s) before entering compartment A to give his disclosure or as a staging area in case there is a queue for the use of the disclosure booth 1. Compartment A may simply be used as a file upload station. Access to compartment A may be through a door (not shown) in the bulkhead 36 or through the door 8 as previously described. Access to compartment B may be through a door 8'.

The various peripheral devices depicted in FIGS. 1 and 2 are described for simplicity as individual computer peripheral components. However, the various peripheral components may be combined together as may be convenient or as may be available on the commercial market. Further, it is contemplated as being within the scope of this disclosure that functionally equivalent or superior devices may be used when they become available as technology corresponding to those components advances.

In another exemplary embodiment, a laptop, desktop or handheld computing device with all or some of the features discussed above may be made available to a disclosing party(s) within the disclosure booth 1 on a secured basis. In such a case, the electronic whiteboard 26 may be an electronic tablet allowing the disclosing party(s) to draw upon it as well as communicate through it as is conventionally done. Such a laptop embodiment is highly portable and may also be secureably available in a conventional office or other space in a building.

Figure 3:
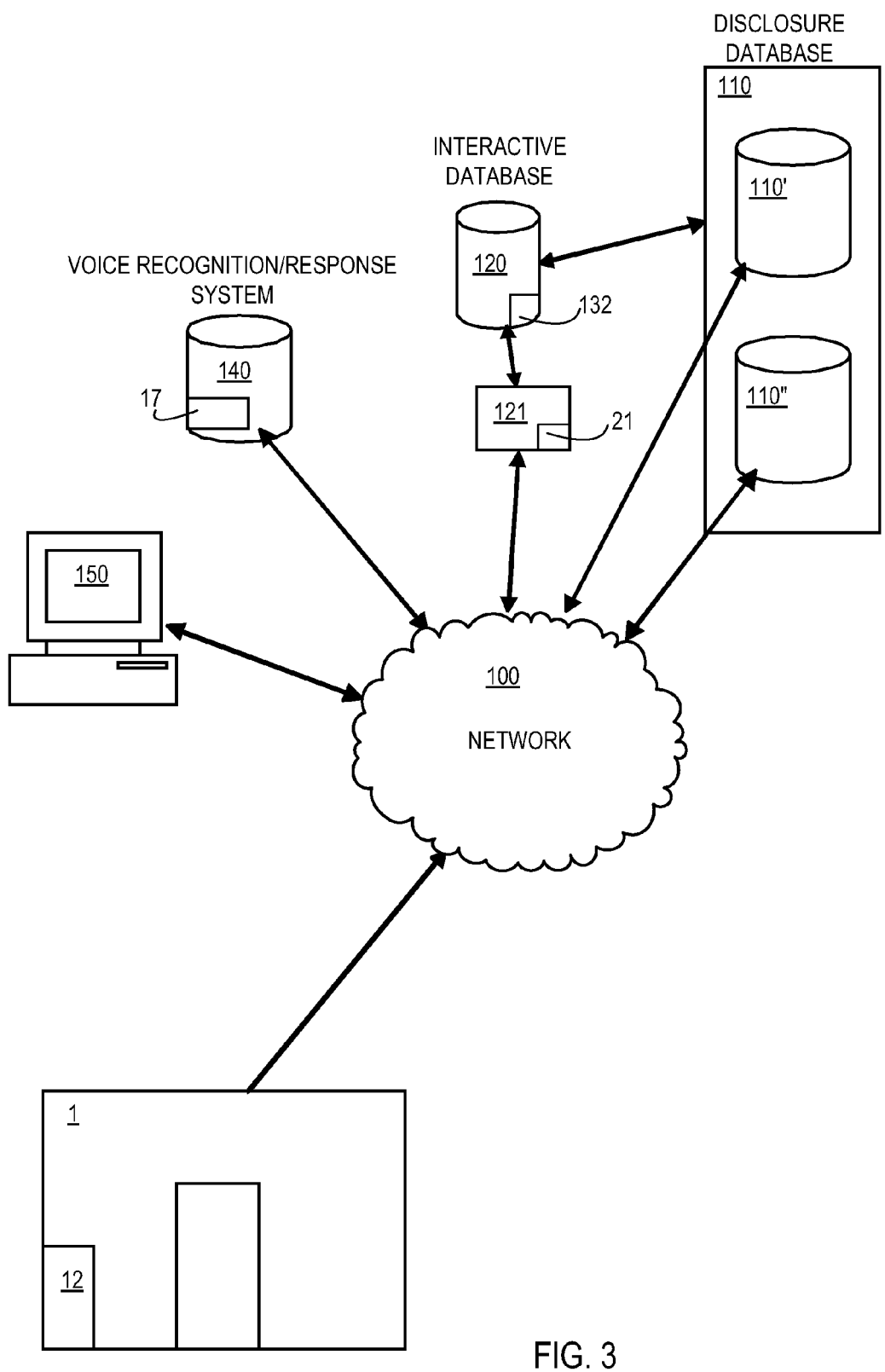
FIG. 3 is a conceptual drawing that illustrates an exemplary embodiment of an invention booth in a network context.

FIG. 3 depicts another exemplary embodiment where the disclosure booth 1 may be in communication with one or more databases (110, 120) via a network 100 utilizing any network communication protocol desired by a systems designer (e.g., TCP/IP, SS7, e-mail, Text Message, etc.) commensurate with the network 100. The network 100 may be any type of wireline or wireless network. For example, the network 100 may be the internet, a Local Area Network (LAN), Wide Area Network (WAN), Wi-Fi network, a public switched telephone network, an artificial intelligent network or a cellular telephone network.

The database 110 may be a network database and may comprise multiple sub-databases of differing types. Exemplary databases may include a flat file, a simple database or a relational database. The database 110 may contain sub-databases (110', 110"). The sub-data base 110' may be a disclosure database where document files, graphics files, audio files and video files may be stored. The sub-database 110" may be a metadatabase. The metadatabase 110" may store information about the information in the disclosure database 110' to allow faster and more efficient database management and performance. However, one of ordinary skill in the art would recognize that the sub-databases 110' and 110" may be combined into one database and there may be more than just two databases as may fit the needs of the system designer. The databases 110, 120 may be separated, co-located on the same memory device, or may be distributed about the network 100.

As part of the disclosure process, the disclosure information provided via the computer 12 may be automatically uploaded to the network database 110. The automatic upload may occur continually in near real, (e.g., as the video recording is made), on a periodic basis (e.g., after the completion of disclosure) or when a certain event occurs such as the scanning of a document page or the saving of a whiteboard drawing. Automatic real-time uploading minimizes the chance that disclosure information may be lost or that confidential information remains within the disclosure booth 1 for an unnecessary length of time, thereby minimizing risks to confidentiality and information security. Prior to uploading, any captured disclosure information may be compiled and formatted into a single presentation file. Such a presentation file/compilation may allow any audiovisual presentation to be reviewed in synchronization with a whiteboard/electronic tablet presentation and/or the display of documents as they were originally presented. The presentation may occur on a computer screen/projector such that some or all portions of the synchronized display may be presented simultaneously as well as separately.

The computer 12 in the disclosure booth 1 may also communicate with an interactive data server 121. The interactive data server 121 may include the interactive database 120. As an alternative to the disclosure application 21 executing on the computing device 12, the interactive data server 121 may execute the disclosure application 21 from a remote location. The disclosure application 21 may provide textual or graphical prompts in the GUI 19 displayed on screen 18/18' (See FIG. 4). The prompts may guide the disclosing party(s) through the disclosure process. The interactive data server 121 may also process (i.e. parse) any response received from the disclosing party in real time, refer the response to the interactive database 120, and use the received information to generate additional prompts or questions concerning or related to the received information.

The interactive database 120 may also include a technology database 132 which may include data and metadata on all of the patents and patent applications owned or written by an entity. The interactive database 120 may then be used to tailor the disclosure process to the disclosing party in real time. For example, an employee comes to the disclosure booth 1 to submit an idea for an improved widget. After signing in using his employee key card, the disclosure application 21 may inquire as to the nature of the inventive idea that the disclosing party has. The disclosing party would then speak or type in a short description such as "magneto-repulsive levitation widget". The disclosure application 21 may then parse the descriptive phrase using the voice response unit 140 or other means as may be known in the art.

Using the parsed phrase, the interactive data system 121 may be consulted by communicating a query message by means well known in the art to the interactive response server 121 to determine what information may be already on file in the interactive database 120 about "magneto-repulsive", "widgets" and "levitation". The disclosure application 21 may then utilize any responses from the data mining of the interactive database 120 by the interactive server 121 to modify, fine tune or redirect questions or prompts to more effectively draw out material information during the disclosure process. Further, the parsed phrase may also trigger an alert to a monitoring entity who may wish to monitor the disclosure in real time or to participate remotely via a remote computing device 150. It should be remembered at this point that the use herein of a patent disclosure is merely a non-limiting example. The same processes may be used with other disclosures such as depositions, debriefings, and lesson plans.

The computer 12 may also communicate with a voice recognition server 140 wherein the voice recognition/response software application 17 may be executing. The voice recognition application 17 may translate any verbal disclosure and produce an electronic transcript for use as a tangible record and for editing to produce a provisional or non-provisional patent application. The voice recognition software 17 may also carry out verbal instructions or speak with the disclosing party via the speaker 42. A non-limiting example of voice recognition software may be Dragon® Naturally Speaking 9.0 from Nuance Communications, Inc. Further, the voice recognition system 140 may also provide input for the interactive data system 120 such that the interactive data system may be prompted via voice commands.

It should be noted that the components illustrated in FIG. 3 and described herein are merely illustrative and non-limiting. The functionality of the voice recognition system 140, the interactive data system 120/121 and the disclosure database 110 may be further dispersed among additional network components, rearranged amongst themselves, consolidated into a single physical server and/or database or even consolidated into the electronics 12 within the disclosure booth 1, if so desired by a system designer.

Figure 4:
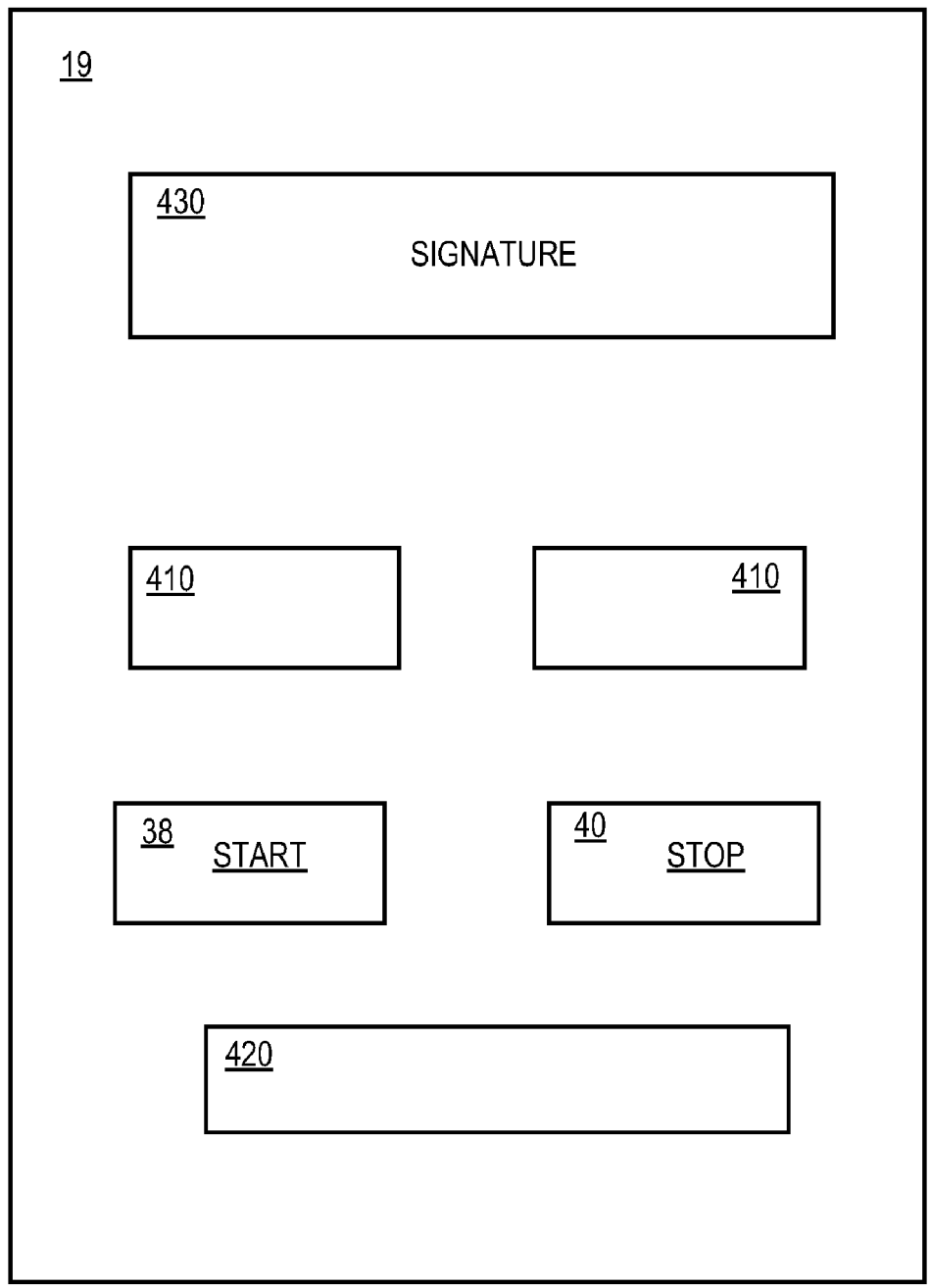
FIG. 4 is an exemplary depiction of a graphical user interface for use in a disclosure booth.

FIG. 4 is a non-limiting, exemplary embodiment of the GUI 19 that may be rendered on the computer screen 18, on a laptop screen or on electronic tablet. The GUI 19 may be designed to render any screen presentation that may be found to be convenient and/or to present a professional appearance as may be desired by a system designer. In an exemplary embodiment, GUI 19 may present one or more graphical and/or or radio buttons 410 presented to the disclosing party as means to initiate the disclosure process, to make choices or to answer questions. For example, the graphical buttons 410 may include a computerized version of the start button 38, stop button 40 or redo button 41. The GUI 19 may be replaced by or operate in conjunction with the voice recognition system 140 whereby the disclosing party may ask and answer questions or direct and be directed via voice commands.

In another exemplary embodiment, the GUI 19 may also include one or more text input fields 420 thereby allowing the disclosing party to input text data. Similarly, the GUI 19 may include a script input box 430 as may be well known in the art such that the signature of the disclosing party may be captured and applied to a desired statement, declaration or set of information that may be required during the disclosure process.

In yet another embodiment, the GUI 19 may include an audio-visual box or split screen that may allow an outside third party to be seen, heard and communicated with. The third party may be capable of influencing the nature, purpose and the order of presentation of the graphical buttons 410, text input fields 420 and script input boxes 430.

Figure 5:
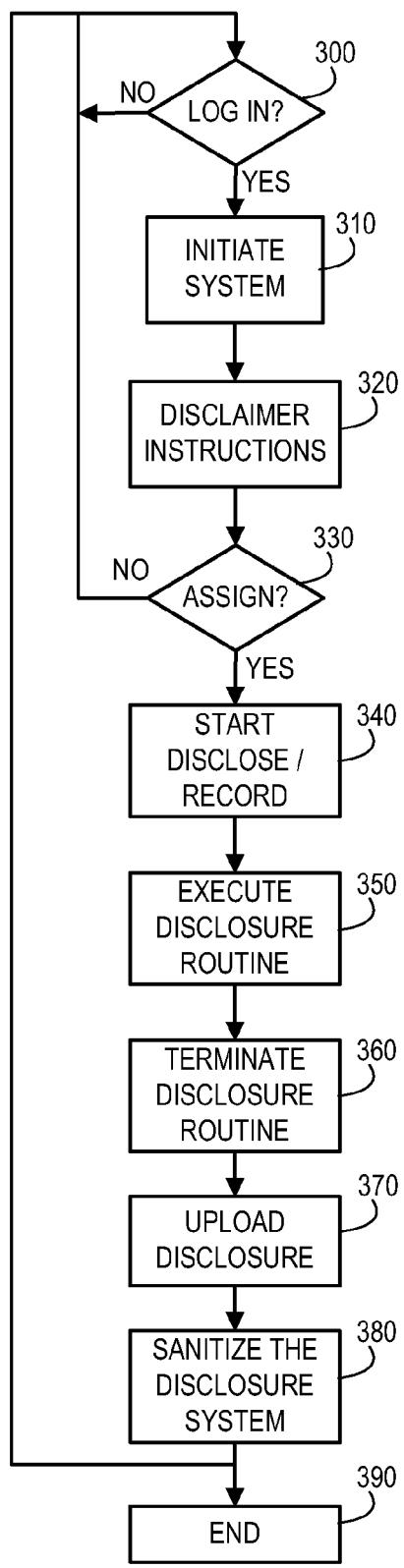
FIG. 5 is a flow diagram of an exemplary method of operation of the disclosure booth.

FIG. 5 is a flow chart of another exemplary embodiment summarizing the major processes executed by the disclosure application 21. One of ordinary skill in the art will realize that functions may be combined, split and rearranged without departing from the scope and intention of the present disclosure. One of ordinary skill in the art would also recognize that the described embodiments may be altered for a specific purpose such as taking a deposition, making an insurance claim, submitting a background investigation, or other circumstance where disclosure from a party is being sought. The same disclosure booth may be used for obtaining disclosure for any number of functions.

The process begins at process 300 where the disclosing party(s) enters the disclosure booth 1 by the door 8 and logs into the disclosure computer 12 using the personal identification device 34. Multiple disclosing parties may log in sequentially. Such a log-in may result in an attendance sheet being generated, inventorship being documented and/or documents being drafted with the proper introductory clauses and signature lines.

Log in may be accomplished in any fashion known to those of ordinary skill in the art. As a non-limiting example, login may be made by payment of cash followed by the entry of a name and contact information. As another non-limiting example, log in may be accomplished electronically by presenting a debit card, a credit card, an identification card, smart card, a bar code or a radio frequency ID chip. The term "presenting" herein is intended to be broadly interpreted. Non-limiting example of "presenting" may include the acts of showing, inserting, swiping, exposing and irradiating. If log-in is accomplished by payment the personal identification device may be an automated vending device or an ATM/bank card machine as are commonly used. As other non-limiting examples, log in may be accomplished by swiping an employee ID card, entering an employee ID number on a key pad, a biometric scan (e.g. retinal or fingerprint scan). Log in may even be done using a facial feature recognition software application working in conjunction with the video camera 22. Log in may also be done remotely by another person outside of the disclosure booth 1 either by visual recognition or other means.

Once the disclosing party(s) is successfully logged-in, the system is initiated at process 310. If the log-in is unsuccessful, the process loops back to await proper log-in. The initiation may begin immediately upon a successful log in or may require an additional operation such as manipulating a transducer by the disclosing party(s). Alternatively, a monitoring party outside the disclosure booth 1 may initiate the disclosure booth 1.

As a non-limiting example, the disclosing party(s) may be required to manipulate the "start button" 38 when they are ready to begin. As another non-limiting example, the monitoring party may initiate the system when the disclosing party(s) is recognized via the video camera 22 and/or the disclosing party(s) indicates that they are ready to begin. Upon initiation, all computer peripherals within the disclosure booth 1 may be energized or otherwise activated as may be well known in the art. Further, the memory storage device 23 may be directed by the operating system 13 to define memory storage space to receive the disclosure information. Although the video camera 22 may be activated continuously for identification purposes in process 300, it may only begin recording disclosure footage to the network databases 110 after the identification has been completed.

Once the system is initiated, the presentation of a disclaimer or operating instructions to the disclosing party via audio or via the GUI 19 may be desired at process 320. As a non-limiting example in the context of a disclosure for an invention, a disclaimer or series of disclaimers tracking the various sections of 35 U.S.C. §102 may be explained to the user. The user may be told that he must be the inventor of all of features of the invention that he is claiming. The policy programmed into the disclosure application 21 in one or more embodiments may be that all disclosing parties must be present during the disclosure. Of course, such policies may vary from one embodiment of the disclosure booth 1 to the next The disclosing party(s) may then manipulate a GUI button, such as the radio button 410, to indicate they are the sole inventor and if not to then list the inventors into a GUI data field(s), such as the field 420, in whatever order that they choose. To further the example, if they do not declare inventorship then the system may terminate.

As an additional non-limiting example, the disclosing party(s) may be warned that any public use or sale of the invention more than a year prior to the filing date of the application being disclosed may prevent the invention from being patented. The disclosing party may then be allowed to enter an appropriate response into the GUI 19, such as a signature or their initials. The process may continue for as many iterations as the system designer may require in order to obtain or impart the necessary information. During the disclaimer/instruction process 320, the disclosing party(s) may be asked if they have any documents that may relate to the questions being asked of the disclosing party. If so, such documents may be entered via the USB port 28, optical disk reader 32, the scanner 30 or a document camera (not shown).

After the disclaimers/instructions have been completed, the system may require some type of positive acknowledgement. As a non-limiting example in the context of a corporate patent application disclosure, such an acknowledgement may be the presentation of an electronic assignment document for signature by all of the inventors discussed above. If the disclosing party(s) fails to sign the assignment at process 330, then the system may shut down and return to process 300. It should be noted that a signature may be collected via any number of technologies available in the market. A non-limiting example may be an electronic pen that may create lines in the input field 420 of the GUI 19. Such devices are commonly used in package delivery and retail check out. An electronic signature may be used as evidence of an agreement. As another non-limiting example, the document may also be printed out from the computer 12 in the disclosure booth 1 via a printer (not shown) for signature and the executed copy scanned back into the computer 12 using the document scanner 30. As part of the assignment or contracting process, the disclosing party may be provided a benefit as consideration for their assignment, agreement and/or other acquiescence.

The disclosure may be started at process 340 by any means. Non-limiting, exemplary starting mechanisms may include a prominent start button, such as the start button 38, located in a convenient location within or outside the disclosure booth 1. The start button 38 may merely connect power to the various peripheral devices discussed above. Alternatively, the disclosure process may be started by manipulating a start button 38 presented within the GUI 19. Further, the disclosure process may begin automatically upon the completion of any prior step in the process such as completing the assignment process 330. One of ordinary skill in the art will recognize that any of the communication processes between the disclosing party(s) and any apparatus in the disclosure booth 1 may also be accomplished by voice commands via the voice recognition application 17 executing on the computer 12 or by the voice recognition system 140, the voice command being detected by a microphone such as an integrated microphone in the video camera 22.

The disclosure process 350 may result in a collection of related but separate files. The disclosure process 350 may also result in a synchronized, multi-media presentation file. The extent of the recording may be dependent upon the number and type of peripherals located and activated within the disclosure booth 1. As a non-limiting example, as the disclosing party(s) begins their discussion (which may be being picked up by the video camera 22) any diagrams in support of their discussion being presented on the whiteboard 26 are also photographed. The electronic whiteboard 26 disclosure may be recorded as it is being presented or may printed to memory periodically as determined by the computer 12 or the whiteboard 26. As such, the video and the whiteboard activity may be replayed in sync with each other on one presentation media.

The presentation device may be a video monitor (e.g. a television) or a computer screen where the screen may be split showing the video in one window and the whiteboard activity in another. Similarly, if a document is submitted via the document scanner 30, USB port 28 or a digital document still camera (not shown), the electronic versions of the documents may be displayed in synchronization with the disclosure footage either in the same display or multiple displays. The result may be a synchronized audiovisual and a tangible record of the disclosure that may be reviewed later in time or may be monitored in real time at a second location. The audio record may also be processed through the voice recognition software application 17/140 such that a written electronic transcript may be automatically produced for both the record and for future editing into a provisional or non-provisional patent application, if any editing is deemed necessary.

The disclosure process may be terminated by any means and at any time at process 360. Non-limiting, exemplary terminating mechanisms may include a prominent stop button, such as the stop button 40, located in a convenient location within or outside the disclosure booth 1. The stop button 40 may merely disconnect power from the various peripheral devices discussed above or it may isolate control of the peripherals and computer 12 from manipulation by the disclosing party. Alternatively, the disclosure process may be stopped by manipulating a stop button 40 presented within the GUI 19. Further, the disclosure process may stop automatically upon the timer 20 timing out after a predetermined amount of time has elapsed.

After the termination of the disclosure routine at process 360, the computer 12 may automatically initiate an integration of the disclosure files and upload the integrated file to the network database 110 at process 370. The various files may include a combination of any or all of audio files, text files, video files and graphics files. The files may be uploaded as a collection, uploaded individually or may be first integrated (or partially integrated) into a single synchronized audio/visual file and then uploaded. The files may be uploaded individually and then integrated at the network database 110. The files may be integrated using any data integration software application known to those of ordinary skill in the art.

After integration and uploading at process 370, the computer 12 may initiate a sanitization routine at process 380. Given that the information disclosed may be at least confidential, and that the disclosure booth 1 may be physically unsupervised, it may be desirable to erase any retrievable disclosure information from any and all memory devices within any device within the disclosure booth 1. Depending on the type of memory used in various devices throughout the disclosure booth 1, different sanitation methods may be used. As a non-limiting example, devices utilizing RAM as computer readable media to record any disclosure may be erased by terminating power to the device in general or the RAM in particular.

For devices using magnetic disks and/or flash memory, deleting and reformatting the media may not be enough to remove the disclosure. Physically destroying the computer readable media may not be practical although in some cases it may be an option. (e.g. optical disks). In other embodiments, devices using magnetic disks or flash memory as computer readable media may execute a software utility that not only removes the confidential files from the root directory of the media but may irretrievably scramble the disclosure data. Such utilities may include software disk "wiping" or "overwriting" software. Exemplary, non-limiting examples may be CiberCide® from CyberScub LLC or WipeDrive[5] from WhiteCrayon Software. Any wiping software utilized within the disclosure booth 1 may meet the DoD 5220.22-M Standard.

As an alternative to utilizing conventional computer peripherals and/or conventional interfaces to those peripherals, various embodiments may utilize programmable logic devices ("PLD") 131 within the computer 12. Sucn PLDs may also be used within any peripheral subsystems 29 (e.g., the video camera 22, projector 24, scanner 30, authentication device 34, whiteboard 26, timer 20, optical disk drive 32, UBS port 28), or as stand alone devices coupling the computer 12 to the various peripherals.

Figure 6:
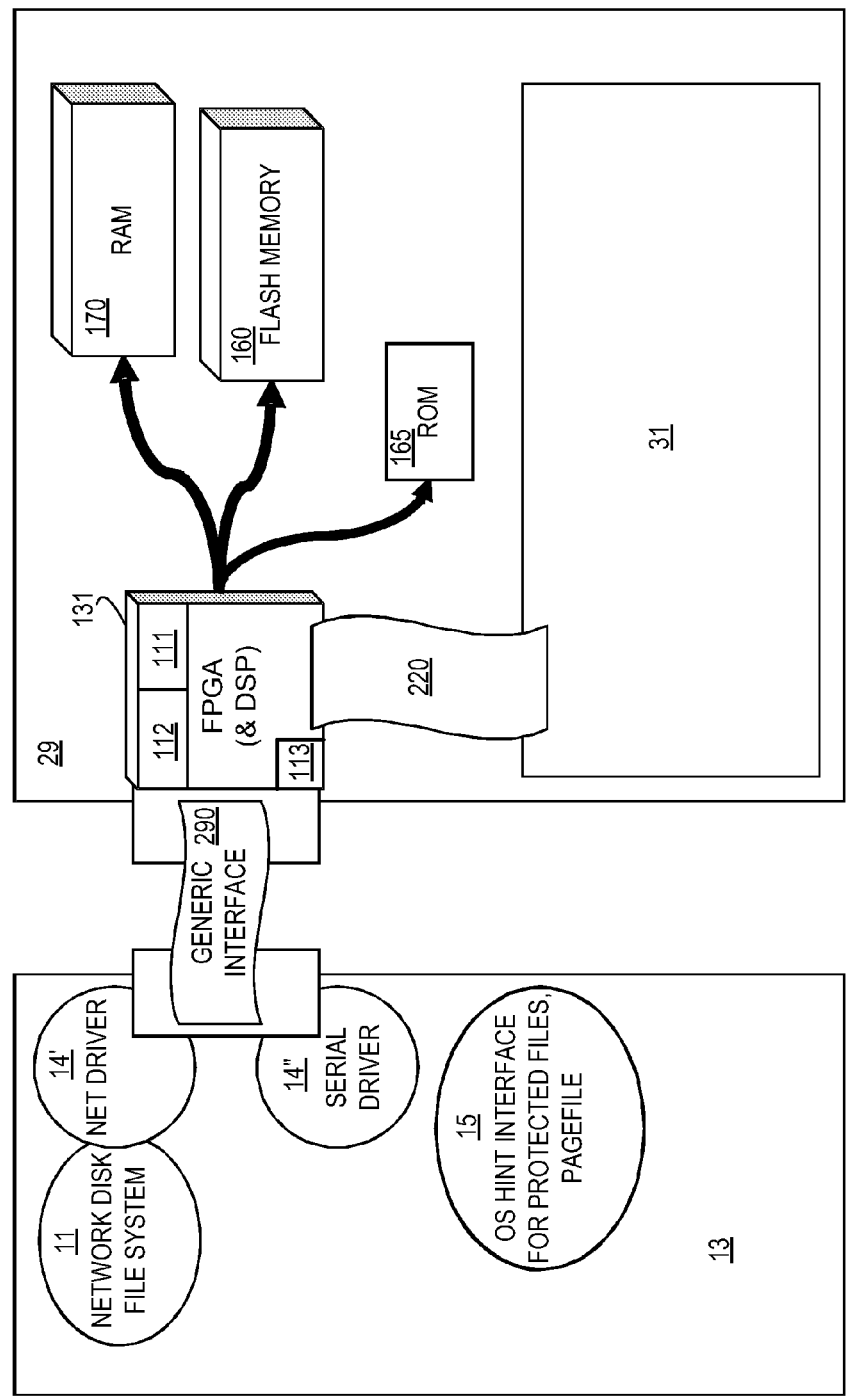
FIG. 6 is an exemplary embodiment of an interface with a peripheral device within the disclosure booth that allows distributed control of the peripheral device.

Referring to FIG. 6, a Field Programmable Gate Array ("FPGA") is a non-limiting example of the PLD 131 that may be used in any embodiments consistent with this disclosure. Other non-limiting examples of the PLD 131 may also include Complex Programmable Logic Devices ("CLPD"), self-organizing single layer, molecular diodes and multi-core DSP circuits. Future innovations improving upon the operation and efficiency of FPGAs specifically and PLDs in general are fully contemplated to be within the scope of the disclosure herein as being components useful in implementing any embodiments discussed herein.

FIG. 6 illustrates an embodiment consistent with the disclosure herein that may assist in allowing a host operating system, such as the operating system 13, to be unburdened from file housekeeping and peripheral management tasks. A PLD, such as the FPGA 131, may be integrated into the peripheral subsystem 29. The FPGA 131 may be mechanically attached to the peripheral subsystem 29 or may be configured as a stand alone component, electrically connected to a peripheral 31 by a device specific interface 220. The peripheral device 31 may be any type of peripheral. As a non-limiting examples, the peripheral device 31 may be a magnetic disk drive (not shown) such as may be included in the computer 12, the optical disk drive 32, the scanner 30, the video camera 22 or any memory device that may be incorporated in any of the peripherals within the disclosure booth 1.

Conventionally, the peripheral 31, such as a camcorder or a printer, is controlled by the operating system 13 of the computer 12 via a special hardware driver. The driver "translates" the operational commands from the operating system 13 into commands that may be recognized over an interface between the computer 12 and the peripheral 31. That interface may be proprietary to the manufacturer of the peripheral. The operating system 13 then receives (or sends) information over the proprietary interface 220 to the peripheral 31.

In order to facilitate and speed the operation (e.g. memory sanitation) of the disclosure booth 1 and unburden the operating system 13 of the computer 12, a generic interface 290 may displace the device specific interface 220 formerly communicating between the peripheral subsystem 29 and the host operating system 13 of the computer 12. The generic interface 290 may be created by using one or more of the PLDs 131. The generic interface 290 may be a serial and/or a network interface. The interface 290 may be a generic/standardized high speed internet protocol ("IP") interface. The interface 290 may be a virtual interface that provides both a virtual network interface and a virtual serial interface with the host operating system 13. A non-limiting example of such a virtual interface is described more fully in co-owned patent application Ser. No. 11/408,766 (U.S. Patent Published Application 2008/0005368) entitled "Peripheral Hardware Devices Providing Multiple Interfaces and Related Systems and Methods".

According to some embodiments, the electronics of the generic interface 290 may be configured to emulate a plurality of interface standards for communication between the peripheral subsystem 29 and the operating system 13 using standard device drivers (14', 14"). For example the electronics of the generic interface 290 may be configured to appear to the operating system 13 as a virtual Ethernet or serial card. A command interface may thus be provided using a virtual serial interface (not shown) within the electronics of the generic interface 290. A functional interface may also be provided using a virtual network interface (Not shown) also within the electronics of the generic electronics interface 290. For example, the functional electronics 131 may be configured to provide functionality of a co-processor and/or a cryptographic accelerator. Moreover the interface electronics 290 may be configured to provide communication between the functional electronics 131 and the host operating system 13. The interface electronics 290 may provide both a virtual network interface and a virtual serial interface with the software operating system 13 through network communication driver 14" and the serial driver 14", respectively. Communications for functionality of the peripheral device 29 maybe provided using at least one of a TCP/IP (Transmission Control Protocol/Internet Protocol) standard, a Common Object Request Broker Architecture (CORBA) standard, a Web Service call standard, a Messaging Queuing (MQ) standard, and/or a Distributed Component Object Model (DCOM) standard. The interface electronics 290 may also be configured to provide setup and/or configuration communication using the virtual serial interface through the serial driver 14" (e.g. remote procedure calls).

The FPGA 131, being reprogrammable in real time, may contain an auxiliary program/operating system 111 and/or a copy of a portion of the operating system 13 that may be required to operate and maintain the peripheral device 31. The FPGA 131 may further include digital signal processing ("DSP") system software 112. The DSP software 112 allows the FPGA 131 to communicate via any device specific protocol that may be required by the peripheral device 31. The FPGA 131 may also include a meta-behavior interpreter 113 which is a rules engine that may translate or augment file instructions received from the host operating system 13 over the generic interface 290. The device specific interface 220, in turn, may be relocated into the peripheral subsystem 29, either mechanically, electrically or both. Because the FPGA 131 contains the controlling software 111/112/113 for the peripheral device 31, the FPGA 131 may autonomously control the peripheral device 31 and relieve the host operating system 13 of that burden by operating and maintaining the peripheral 31 in the background. A non-limiting example of the peripheral subsystem 29 is further described in detail in co-owned U.S. Patent Application 2006/0036786 A1, As such, the peripheral subsystem 29 appears to the host operating system 13 as a network file system within the host computing device 12 where entire files may be requested instead of the host operating system 13 having to directly control the peripheral device 31 and then read and write blocks of data to compile a file. It should be noted that the host operating system 13 may now be rationalized or slimmed down relative to the operating system's previous size and complexity.

Because the auxiliary operating system 111 required to operate the peripheral device 31 is programmed into the FPGA 131, the host operating system 13 may now communicate with the peripheral subsystem 29 using the generic serial driver 14" (for a internal physical device) or the generic network driver 14' (for a network or virtual device) via the generic interface 290. The auxiliary operating system 111 may autonomously communicate with and control the peripheral device 31 via the device specific interface 220 (e.g., SCSI, ATA, SATA, Firewire, Fiber Channel etc.). According to exemplary embodiments, the device specific interface 220 is invisible to the host operating system 13. Any device specific communication protocols that may be used to control the peripheral 31 over the device specific interface 220 may be translated to the common network protocol 14'/14" by which the peripheral 31 communicates with the host operating system 13.

Therefore by incorporating one or more of the PLDs 131 into the computer 12 or into any of the peripherals the computer 12 may allow the computer 12 to more quickly and efficiently accomplish the task of integrating and uploading the various disclosure files and then sanitizing its own memory devices. Simultaneously, the PLD 131 may attend to sanitizing any memory devices integrated into the various peripherals that may continue to contain confidential files. This may be desirable because the operating system 13 of the computer 12 may not be able to communicate or manipulate the local peripheral memory devices because of proprietary interface incompatibilities. However, the various PLDs 131 may contain the auxiliary operating system 111 that does have the ability to reach the various local memory devices within their specific peripherals and may be commanded to sanitize those devices by receiving a simple network driver form the operating system 13 of the computer 12.

As a non-limiting example, the peripheral device 31 is depicted as a generic box. Consistent with the disclosure herein, the peripheral device 31 may be any type of real or virtual device. Additional non-limiting examples of the peripheral device 31 may be a memory device, a disk drive, an I/O device, a network interface card, a game controller and the like. Each peripheral device 31, regardless of its function, may communicate with the host operating system 13 over the generic interface 290 via the generic serial 14" and/or network driver 14'. By incorporating the auxiliary operating system 111 associated with each particular peripheral device 31 within each FPGA 131, the host operating system 13 is unburdened from having to perform routine housekeeping operations thereby increasing the host operating system's operational efficiency and speed for more critical tasks. The FPGA 131 essentially exposes the peripheral device 31 to the host operating system 13 as a simple network file system while the auxiliary operating system 111 programmed into the FPGA 131 manages the physical storage of the data, the DSP 112 manages the device specific interface protocol, and the meta-behavior interpreter 113 interprets and augments any instructions or "suggestions" received from the host operating system 13.

Through the generic interface 290, disparate peripheral subsystems, such as the peripheral subsystem 29, operating under disparate communication protocols may communicate with the host operating system 13 using a single standard protocol, such as the standardized protocol 14'/14". In addition to the standardized protocol 14'/14", the host operating system 13 may also communicate with an additional meta-behavior interface 15 controlled by the auxiliary operating system 111. According to exemplary embodiments, the meta-behavior interface 15 communicates additional data handling instructions to the FPGA 131. The meta-behavior interface 15 may provide an additional layer of control for the peripheral subsystem 29 and may direct the FPGA 131 on file behavior in addition to controlling file attributes which may be ignored or countermanded by the user application.

For example, if the meta-behavior interface 15 is told by the host operating system 13 that this is a "temporary" or a "classified" file, then the meta-behavior interpreter 113 may revise and reinforce the 'classified' status such that only an appropriate revocation command communicated through the same meta-data interface will unlock it. Alternatively, the meta-behavior interpreter 113 may reinforce the 'temporary' status such that upon completion of the disclosure at process 390, those files identified may be permanently and irretrievably erased. According to exemplary embodiments, the meta-behavior interface 15 is used to manipulate file and file system behavior that cannot or should not be manipulated by the host operating system 13. Without the meta-behavior interface 15 and/or meta-behavior interpreter 113, the filing system controlled by the FPGA 131 may collapse into what may appear to the host operating system 13 as a traditional network file system. From the meta-behavior interface 15 and from inference based on usage, file name, location and the like, files may be more flexibly processed. As non-limiting examples, the meta-behavior interface 15 may identify files as protected files, designate disk space as a pagefile, identify file checkpoints and rollbacks, direct file locations on physical disks, and the like. The meta-behavior interpreter 113 may translate, augment, amplify and/or modify the processing requested by the host operating system 13.

The FPGA 131 incorporated in a particular peripheral subsystem, such as the peripheral subsystem 29, may be programmed in a number of ways. The FPGA 131 may be pre-programmed by the manufacturer such that the auxiliary operating system 111 required to operate the peripheral device 31 is contained in flash memory 160 and flashes the FPGA upon boot up. As a non-limiting example, the auxiliary operating system 111 may be a custom file system which may also contain a custom device driver for the peripheral device 31. Any number of non-volatile memory devices may be used for this function.

Alternatively, the flash memory 160 may cause the FPGA 131 to request or draw the required programming from the host operating system 13 upon boot up using a bin loader program, or the required programming may be obtained through a combination of a draw from the operating system 13, a programming from the flash memory 160 and/or a programming draw from a network based storage device. A manufacturer may also include other means for programming the FPGA 131 such as including read only memory 165 or other device that meets a particular manufacturer's requirement. RAM 170 may be utilized as temporary storage to facilitate the operations of FPGA 131, as may be desired by a system designer.

A non-limiting exemplary embodiment utilizing PLDs may feature the use of a FPGA inserted as an interface between the operating system 13 and the disclosure collection applications 15 of the computer 12 and each of the video camera 22, electronic whiteboard 26, projector 24, and scanner 30. To the extent it may be desirable that other or additional peripherals may be used to facilitate the disclosure presentation, similar interfaces may be inserted.

The host operating system 13 includes the peripheral driver 14 and a file system 11, including support software for the peripheral 31. The host operating system 13 communicates with the peripheral subsystem 29 via the device specific interface 220 of the peripheral 31. The peripheral's device specific interface 220 exclusively uses one of several current interface standards or may be a new interface standard arising in the future. Non-limiting interface examples of device specific interface standards my include Small Computer System Interface ("SCSI"), Universal Serial Bus ("USB"), Firewire, Fiber Channel, Enhanced Integrated Drive Electronics ("EIDE"), Advanced Technology Attachment ("ATA"), Serial Advanced Technology Attachment ("SATA") and the like.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for obtaining the secure disclosure of information from a disclosing party by a computing device comprising:
   receiving a log-in establishing an identity of the disclosing party;
   receiving a transducer output initiated by the disclosing party, the transducer output instantiating a disclosure software application resident within the computing device;
   providing a prompt to the disclosing party to provide audio/visual data, graphic data and textual data;
   receiving at least two of audio/visual data, graphic data and textual data from means for contemporaneously collecting the at least two of audio/visual data, graphic data and textual data in response to the prompt;
   uploading the at least two of audio/visual data, graphic data and textual data after the disclosure software application has terminated; and
   irrecoverably erasing the at least two of the audio/visual data, graphic data and textual data from both the computing device and from the means for contemporaneously collecting the at least two of audio/visual data, graphic data and textual data.

2. The method of claim 1 wherein receiving a log-in establishing the identity of the disclosing party is accomplished by the disclosing party providing biometric data.

3. The method of claim 1 wherein receiving a log-in establishing the identity of the disclosing party is accomplished by the disclosing party presenting a identification card with identification information electronically recorded thereon.

4. The method of claim 1 wherein uploading of the at least two of audio/visual data, graphic data and textual data includes integrating the at least two of audio/visual data, graphic data and textual data into a single synchronized multi-media format.

5. The method of claim 1 wherein providing a prompt to the disclosing party is accomplished by a monitoring third party.

6. A tangible computer readable medium containing instructions thereon for accomplishing acts comprising:
   receive a log-in establishing an identity of the disclosing party;
   receive a transducer output initiated by the disclosing party, the transducer output instantiating a disclosure software application resident within the computing device;
   provide a prompt to the disclosing party to provide audio/visual data, graphic data and textual data;
   receive at least two of audio/visual data, graphic data and textual data from means for contemporaneously collecting the at least two of audio/visual data, graphic data and textual data in response to the prompt;
   upload the at least two of audio/visual data, graphic data and textual data after the disclosure software application has terminated; and
   irrecoverably erase the at least two of the audio/visual data, graphic data and textual data from both the computing device and from the means for contemporaneously collecting the at least two of audio/visual data, graphic data and textual data.

7. The computer readable medium of claim 6 wherein receiving a log-in establishing the identity of the disclosing party is accomplished by the disclosing party providing biometric data.

8. The computer readable medium of claim 6 wherein receiving a log-in establishing the identity of the disclosing party is accomplished by the disclosing party presenting a identification card with identification information electronically recorded thereon.

9. The computer readable medium of claim 6 wherein uploading of the at least two of audio/visual data, graphic data and textual data includes integrating the at least two of audio/visual data, graphic data and textual data into a single synchronized multi-media format file.

10. The computer readable medium of claim 6 wherein providing a prompt to the disclosing party is accomplished by a monitoring third party.

11. The computer readable medium of claim 6 wherein the multi-media format file is uploaded to a network database and meta-data derived from the multi-media format file is stored in a meta-database.

12. The computer readable medium of claim 6 further comprising the act of receiving an output signal from a timer at the completion of a preset time period, the timer output terminating the disclosure software application executing within the computing device.

* * * * *